United States Patent Office 3,825,542
Patented July 23, 1974

---

3,825,542
2-HETERO SUBSTITUTED 4(3H)-QUINAZOLINONES
Frederick C. Novello, Berwyn, Pa., assignor to
Merck & Co., Inc., Rahway, N.J.
No Drawing. Filed Oct. 12, 1972, Ser. No. 297,154
Int. Cl. C07d 51/42
U.S. Cl. 260—256.5 R
8 Claims

ABSTRACT OF THE DISCLOSURE

2-Hetero substituted 6-sulfamoyl-7-substituted-4(3H)-quinazolinone products are described. The products are prepared by conventional methods employing the appropriate anthranilamide and the hetero carboxylic acid halide. The products are xanthine oxidase inhibitors.

---

This invention is concerned with 6-sulfamoyl-7-substituted-4(3H)-quinazolinone compounds having a heterocyclic substituent attached to the 3-position carbon which products have been found to exhibit marked xanthine oxidase inhibiting properties equal to or greater than exhibited by allopurinol when all compounds are evaluated in the same *in vitro* test.

The novel products of this invention have the structural formula

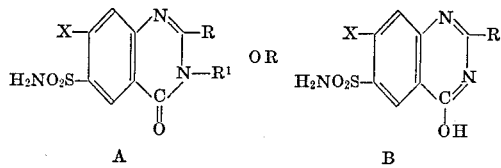

and pharmacologically acceptable salts thereof wherein X represents halogen preferably chloro, bromo or trifluoromethyl; R represents a heterocyclic substituent selected from pyridyl, pyrazinyl, pyrimidinyl or pyridazinyl and $R^1$ represents hydrogen or $C_{1-3}$ alkyl. In those compounds wherein $R^1$ is hydrogen, tautomerism permits the structure of the compounds to be either the keto form, structure A, or the enol form, structure B. For convenience the compounds hereinafter will be identified as ketones but it is to be understood that in compounds wherein $R^1$ is hydrogen the product can exist in either or both configurations.

The products of this invention can be prepared by reacting the selected anthranilamide with the heterocyclic carboxylic acid halide which, for practical purposes, can be the acid chloride. The acid chloride can be preformed and employed in the reaction or it can be prepared in situ by the addition of phosphorus oxychloride to a mixture of the anthranilamide and the heterocyclic carboxylic acid. When the acid chloride is preformed, the reaction advantageously is conducted in the presence of an inert solvent such as dioxane, tetrahydrofuran, dimethylformamide, and the like and is facilitated by heating up to the reflux temperature of the reaction mixture. When the heterocyclic acid chloride is formed in situ, the phosphorus oxychloride serves not only to form the acid chloride but as solvent as well.

Pharmacologically acceptable salts generally are the alkali metal salts or the alkaline earth metal salts. The alkali metal salts advantageously are prepared by dissolving the selected quinazolinone compound in an aqueous or alcoholic solution of the alkali metal hydroxide and if desired isolating the salt by evaporating the solvent. Any of the conventional alkali metal salts such as the sodium, potassium, lithium, or the like salts can be prepared by this method or by other methods known to organic chemists. The alkaline earth metal salts are prepared by replacement of the alkali metal by an alkaline earth metal by well known procedures.

The novel products of this invention are effective inhibitors of xanthine oxidase thus decreasing the concentration of uric acid in the blood and urine and are effective in increasing the excretion of hypoxanthine and xanthine. The products therefore are useful in the treatment and management of gout preferably by oral administration of from about 100 to 800 mg. per day in divided doses as prescribed by the physician.

The following method was employed to prepare the products identified in Table I.

METHOD A

An intimate mixture of the anthranilamide derivative (0.01 mole), the heterocycloic carboxylic acid (0.01 mole) and phosphorus oxychloride (25 ml.) is stirred at room temperature for 24 hours and then poured onto ice. The solid is collected and heated on the steam bath with ethanol (50 ml.) and concentrated ammonium hydroxide (50 ml.) for one hour. After concentration in vacuo, the residue is treated with water (50 ml.), acidified with hydrochloric acid and the product recrystallized from a mixture of dimethylformamide and water.

TABLE I

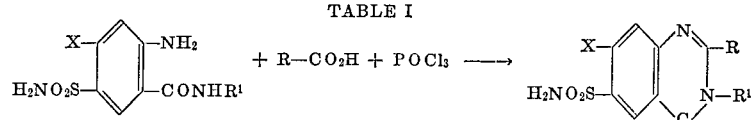

| Example number | X | $R^1$ | R | M.P., °C. | Formula | Calculated C | H | N | Found C | H | N |
|---|---|---|---|---|---|---|---|---|---|---|---|
| 1 | Cl | H | 4-pyridyl | 337 | $C_{13}H_9ClN_4O_3S$ | 46.36 | 2.69 | 16.63 | 46.52 | 2.70 | 16.67 |
| 2 | Cl | H | 4-pyrimidinyl | 328–330 | $C_{12}H_8ClN_5O_3S$ | 42.67 | 2.39 | 20.74 | 42.56 | 2.41 | 20.27 |
| 3 | Cl | $CH_3$ | 4-pyridyl | 263–265 | $C_{14}H_{11}ClN_4O_3S$ | 47.93 | 3.16 | 15.97 | 47.80 | 3.10 | 15.95 |
| 4 | Cl | H | 4-pyridazinyl | >360 | $C_{12}H_8ClN_5O_3S$ | 42.67 | 2.39 | 20.74 | 42.37 | 2.50 | 20.52 |
| 5 | $F_3C$ | H | do | 316–317 | $C_{13}H_8F_3N_5O_2S$ | 42.05 | 2.17 | 18.86 | 41.93 | 2.35 | 18.5 |
| 6 | Cl | H | 2-pyrazinyl | 334–336 | $C_{12}H_8ClN_5O_3S$ | 42.67 | 2.39 | 20.74 | 42.85 | 2.66 | 20.55 |
| 7 | $F_3C$ | H | 4-pyrimidinyl | 288–290 | $C_{13}H_8F_3N_5O_3S$ | 42.05 | 2.17 | 18.86 | 41.90 | 2.24 | 18.60 |

Representative 3-hetero-6-sulfamoyl-7-substituted-4-(3H)-quinazolinone products were found to be effective when tested by an art-recognized procedure designated to evaluate xanthine oxidase inhibiting properties of compounds. The procedure used employed the principles described in J. Pharm. Sci. 56:955 (1967), Baker et al. and was carried out in the following manner:

A reference cuvette is filled with 0.05M pH 7.4 buffer. For the control, mix quickly in a cuvette 2 ml. hypoxanthine solution ($6 \times 10^{-5}$ M), 2 ml. 0.05M pH 7.4 buffer solution, and 2 ml. xanthine oxidase solution, and immediately record the absorbance at 292μ for one minute. For the test solution, add quickly to a separate cuvette 2 ml. hypoxanthine solution ($6 \times 10^{-5}$ M), 2 ml. test solution, and 2 ml. xanthine oxidase solution, and immediately record the absorbance at 292μ for one minute. If the inhibition is less than 100%, the percent inhibition is calculated as follows:

$$\frac{\Delta A\ \text{control} - \Delta A\ \text{test}}{\Delta A\ \text{control}} \times 100$$

where $\Delta A$ is the change in absorbance in one minute. If the inhibition is 100%, the test solution is serially diluted to determine the concentration required for 50% inhibition.

The percent inhibition effected by certain representative products is provided in the following table. The concentration of the test compound is given in the table. For comparison $3.2 \times 10^{-6}$ M of allopurinol, a known xanthine oxidase inhibiting agent, effects 50% inhibition of xanthine oxidase by this protocol.

TABLE II

| Example number of test compound | Xanthine oxidase | |
| --- | --- | --- |
| | Percent inhibition | Concentration |
| 1 | 50 | $4 \times 10^{-7}$ M |
| 2 | 84 | $2 \times 10^{-7}$ M |
| 3 | 40 | $2 \times 10^{-6}$ M |
| 4 | 51 | $2 \times 10^{-8}$ M |
| 5 | 54 | $2 \times 10^{-8}$ M |
| 6 | 19 | $2 \times 10^{-5}$ M |
| 7 | 26 | $2 \times 10^{-4}$ M |

I claim:
1. A quinazolinone compound having the structural formula

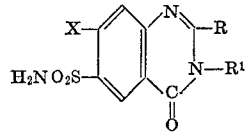

and pharmacologically acceptable salts thereof wherein X represents chloro, bromo or trifluoromethyl; $R^1$ represents hydrogen and $C_{1-3}$ alkyl and R represents 2,3-, or 4 pyridyl, 2- or 3-pyrazinyl, 2-, 5- or 6 pyrimidinyl and 3-, 4- or 5-pyridazinyl.

2. A product as claimed in Claim 1 wherein X is chloro.

3. A product as claimed in Claim 1 wherein $R^1$ is hydrogen.

4. The product as claimed in Claim 1 wherein X is chloro, R is 4-pyridyl and $R^1$ is hydrogen.

5. The product as claimed in Claim 1 wherein X is chloro, R is 4-pyrimidinyl and $R^1$ is hydrogen.

6. The product as claimed in Claim 1 wherein X is chloro, R is 4-pyridazinyl and $R^1$ is hydrogen.

7. The product as claimed in Claim 1 wherein X is trifluoromethyl, R is 4-pyridazinyl and $R^1$ is hydrogen.

8. The product as claimed in Claim 1 wherein X is trifluoromethyl, R is 4-pyrimidinyl and $R^1$ is hydrogen.

References Cited
UNITED STATES PATENTS

| | | | |
| --- | --- | --- | --- |
| 3,518,392 | 6/1970 | Shetty | 260—256.5 |
| 3,557,117 | 1/1971 | Shetty | 260—256.5 |
| 3,560,619 | 2/1971 | Harrison | 424—251 |
| 3,549,634 | 12/1970 | Shetty | 260—256.5 |
| 3,518,267 | 6/1970 | Shetty | 260—256.5 |
| 3,539,564 | 11/1970 | Shetty et al. | 260—247.1 |
| 2,075,359 | 3/1937 | Saltzberger et al. | |
| 3,714,093 | 1/1973 | Wolf et al. | 260—251 QA |

OTHER REFERENCES

Shetty et al.: Chemical Abstract 73:77191c (1970).

DONALD G. DAUS, Primary Examiner

R. D. McCLOUD, Assistant Examiner

U.S. Cl. X.R.

260—250 R, 250 A, 251 Q, 556 B; 424—251